May 15, 1934.   N. J. MEDVEDEFF   1,958,486
RETRACTABLE WING AND LANDING GEAR
Original Filed Sept. 26, 1928   3 Sheets-Sheet 1
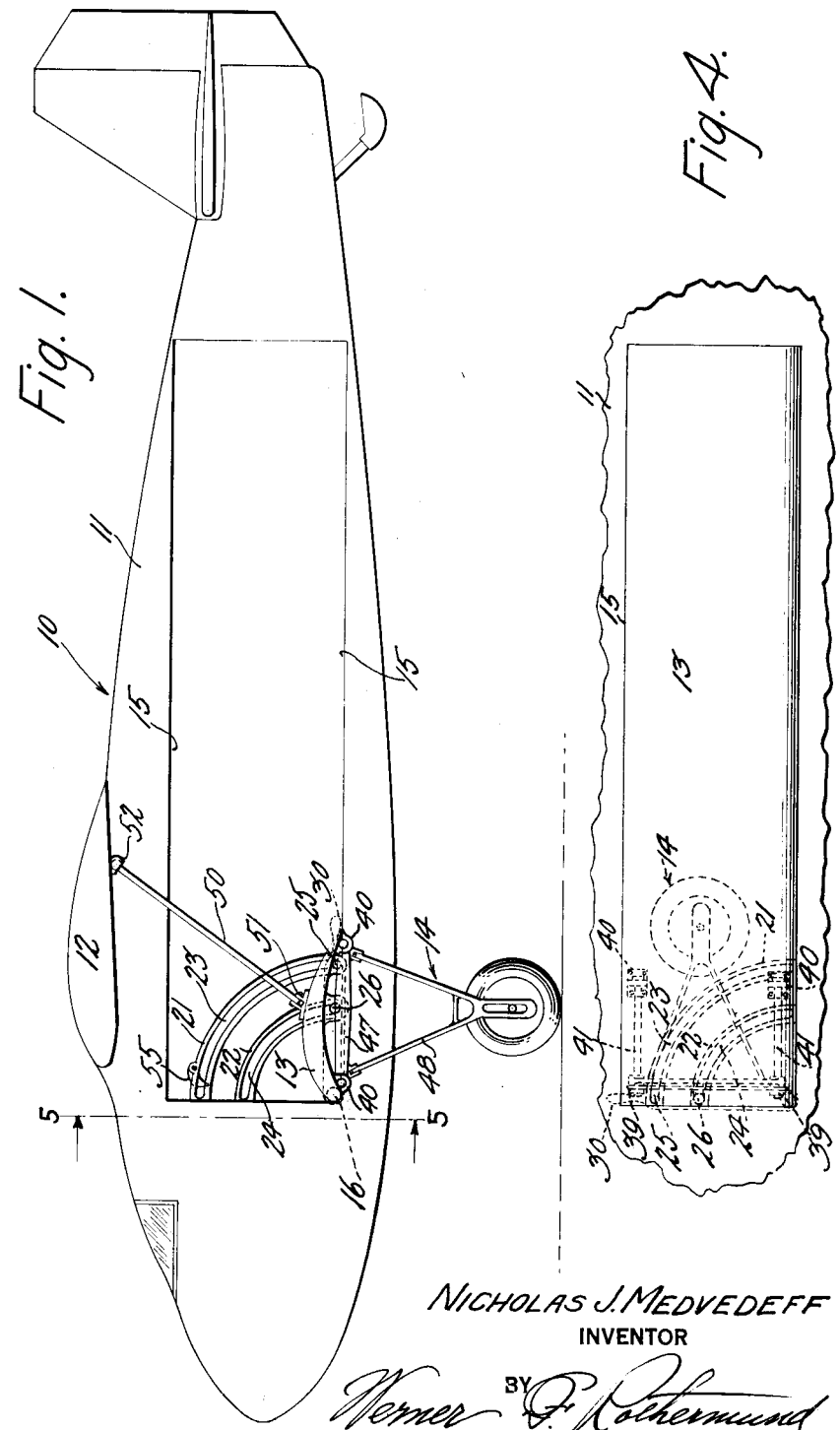

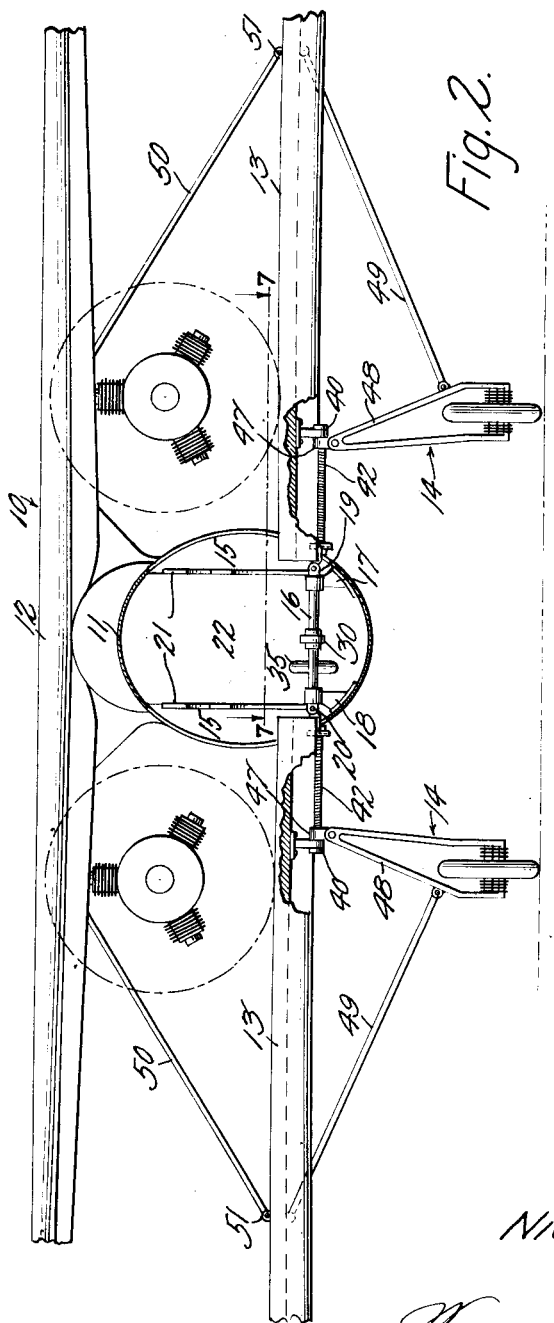
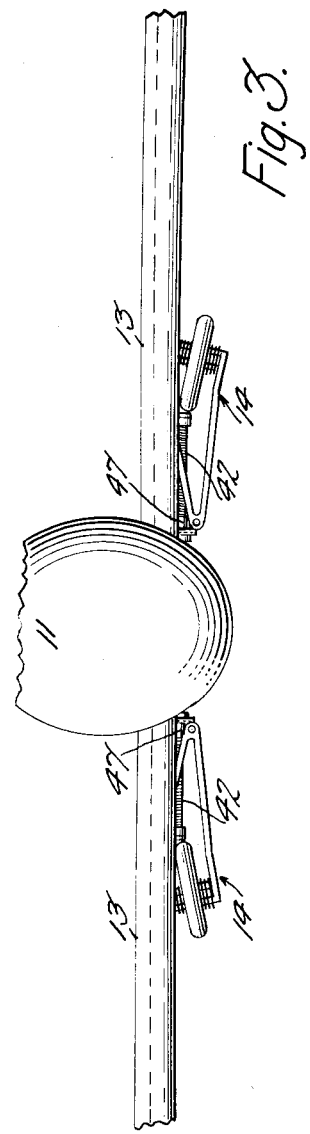

May 15, 1934.   N. J. MEDVEDEFF   1,958,486
RETRACTABLE WING AND LANDING GEAR
Original Filed Sept. 26, 1928   3 Sheets-Sheet 3
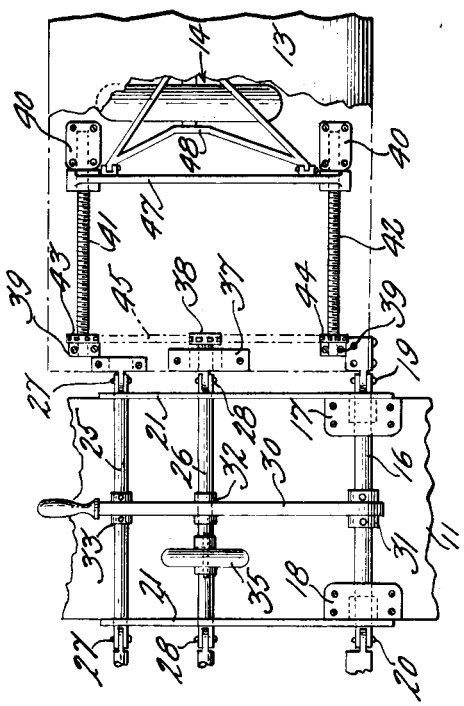
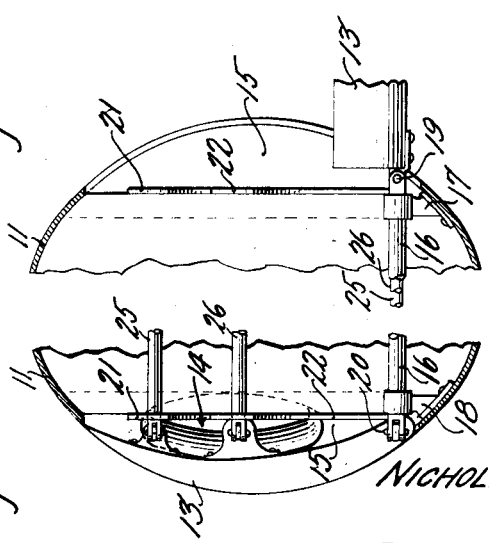
NICHOLAS J. MEDVEDEFF
INVENTOR
BY
ATTORNEY Patented May 15, 1934

1,958,486

UNITED STATES PATENT OFFICE 1,958,486

RETRACTABLE WING AND LANDING GEAR

Nicholas J. Medvedeff, Beechurst, N. Y., assignor to Aircraft Improvement Corporation, New York, N. Y., a corporation of Delaware Application September 26, 1928, Serial No. 308,489
Renewed March 21, 1932

23 Claims. (Cl. 244—12)

This invention relates to aeroplanes and more particularly to improvements in retractable wing and landing gear.

The performance of an aeroplane in flight is governed by the take-off and landing requirements, whilst clean and skillful design also contribute thereto to no small degree.

The flying qualities of many an aeroplane are therefore based on the reasonable length of run and good climbing angle attained in starting and by the necessary retarded motion in landing in order not to overstep the limits of safe landing speed.

The usual undercarriage so necessary to the ground performance of a plane, is not only of no use in flight but offers a considerable restraint to its operation as far as speed and range are concerned. There is a noticeable trend in the industry at present to obviate the last mentioned shortcoming by the provision of a retractable landing gear.

The requirements for a safe landing necessitate an adequate area of wing. The greater the area of wing and the deeper the camber of the airfoil, the slower will be the approach to the ground. This highly desirable feature in landing offers however a great restraint to the otherwise high speed characteristics which the plane may possess while it also opposes radius of action and manœuverability.

My present invention provides an improved construction whereby the high speed characteristics of a plane may be greatly enhanced without detracting from the lifting capacity thereof at low speeds.

It is one of the principal objects of the invention to so construct the lower wing and landing gear that both may be retracted after taking-off and returned to their initial positions when a landing is contemplated.

Retractable landing gears are known in the art, but in this invention there is featured a means whereby both the landing gear and lower wing may be so retracted into a suitable space provided in the sides of the fuselage that there will be formed a smooth streamlined body offering little or no resistance to the air, without however handicapping available space inside of the fuselage.

In the preferred form, the landing gear is first retracted into the concaved lower portion of the wing and then the whole combination is swung to the side of the fuselage where it is received into a suitable recess, the upper or convex portion of the wing providing in its actuated position a rounded and smooth exterior in full harmony with the general contour of the fuselage.

In as much as in flight, the lesser the wing area, the greater the speed, it becomes of high advantage after a take-off has been negotiated, to retract the lower wing in conjunction with the landing gear so that also a very considerable part of the parasite resistance may be oviated, thus doubly contributing towards the increase of high speed and connected therewith it also provides good manœuverability.

It is generally conceded that the reduction of wing area is highly conducive towards increase of speed, and a great many attempts have been made to obtain reduction of wing area in flight by telescopically moving wing tips, or by changing the wing camber. Most of these constructions however require a complicated mechanism and are usually inefficient on account of structural weaknesses. The present invention on the other hand provides a simple solution of the problem by the retraction of both the landing gear and the lower wing in such a manner that they actually become part of the fuselage, thus firstly, reducing the wing area and secondly, positioning the retracted portions so that no parasite resistance is offered, with the resultant increase in speed and accompanying characteristics.

It is obvious that the wing structure herein disclosed can be used to advantage with other forms of retractable landing gears and also with landing gears set stationary (i. e. wing only retractable) and accordingly I do not confine my invention to the use of this particular type of landing gear in combination with the wing structure as shown.

Various other objects of the invention will be in part obvious from an inspection of the accompanying drawings and a careful consideration of the following particular description and claims of one form of mechanism embodying my invention.

In the drawings:—

Figure 1 is a side elevation of an aeroplane showing the present invention as applied thereto.

Figure 2 is a front elevation of the parts shown in Fig. 1.

Figure 3 is a fragmentary view similar to Fig. 2 showing the landing gear retracted.

Figure 4 is a fragmentary view similar to Fig. 1 showing both the landing gear and the lower wing retracted.

Figure 5 is a fragmentary cross section taken on the line 5—5 of Fig. 1 on a somewhat larger scale and discloses the pivotal connection between the lower wing and the fuselage.

Figure 6 is a view similar to Fig. 5 showing both the landing gear and the wing in their retracted positions.

Figure 7 is a detail plan view taken on the line 7—7 of Fig. 2 and shows the operating mechanism on an enlarged scale.

With reference to the drawings, 10 designates an aeroplane having a fuselage 11, upper wings 12, lower wings 13, and a retractable landing gear 14.

On both sides of the fuselage there is provided a longitudinally extended recess 15 large enough to permit of the lower wings 13 being entirely disposed therein respectively in a manner more fully described hereinafter.

The lower wings 13 are pivotally connected to the fuselage at their inner leading edges by a form of universal joint comprising a shaft 16 extending through the fuselage and mounted for rotation in the bearings 17, 18. At the outer ends of this shaft pivotal connections 19, 20 are formed by means of which the wings are attached to the shaft.

Within each recess 15 there are secured a pair of guides 21, 22 having arcuate slots 23, 24 the centers of which are coincident with the axis of rotation of the shaft 16. Shafts 25, 26 extend through the slots above mentioned said shafts being also provided with pivotal connections 27, 28 with which the wings are additionally secured to the plane. The pivotal connections 19, 27 and 28 on both sides of the fuselage should be disposed in the same plane respectively so that the lower wings 13 may be swung about said pivots in much the same manner as a door on its hinges.

The above mentioned shafts 16, 25 and 26 extend through an operating lever 30 provided with laterally extending hub portions 31, 32 and 33 of which the hubs 31 and 33 are secured to the shafts 16 and 25 respectively as shown and the shaft 26 being mounted for rotation within the hub 32.

Upon the shaft 26 there is keyed a hand wheel 35, and it will be seen in Fig. 7 that the shaft passes through bearings 37 secured to each of the lower wings and that it is provided at each end with a sprocket wheel 38 which can be manually rotated by means of the hand wheel 35.

Mounted beneath the lower wings in suitable bearings 39, 40 are a pair of screw-threaded shafts 41, 42 also provided with sprockets 43, 44 all of said sprockets being drivably interconnected by a suitable chain 45. Upon these screw-threaded shafts there is mounted a traveling carriage 47 to which is pivotally attached the wheel supporting frame 48, said frame being connected somewhere near its lower extremity by a struct 49 (Fig. 2) attached to the wings 13. A further strut 50 is attached to the upper portion of the wing 13 by a connection 51 and to the lower portion of the upper wing 12 by a universal joint connection 52.

The operation of the device is as follows:—

Assuming the parts to be in the positions shown in Figs. 1 and 2, and the plane being in flight following a take-off accomplished at low speed due to use of both the upper and lower wings, it now becomes desirable to retract both the landing gear and the lower wings so as to attain high speed and to this end the pilot proceeds first to operate the hand wheel 35 which actuates the carriages 47 on both sides of the plane through the shaft 26, sprockets 38, 43 and 44 and the screw-threaded shafts 41, 42 which draw the wheel frames 48 adjacent their upper pivoted connections towards the center of the plane. The lower portion of the wheel frames being attached to the wings by means of the struts 49, this movement of the carriages 47 towards the center will cause the wheel frames to be drawn under the wings as shown in Fig. 3.

The pilot having retracted the landing gear, now grasps the handle formed on the lever 30 and moves it from its initial horizontal position (Fig. 1) through an arc controlled by the slots 23, 24 to the vertical position shown in Fig. 4. This action will cause rotation of the shaft 16 in the bearings 17, 18 whilst the shafts 25, 26 will follow the slotted guides and carry with them the inner trailing ends of the lower wings, the inner corners of the leading edges being restrained to rotation with the shaft 16. The outer ends of the wings being prevented from following this arcuate course by the struts 50, will be drawn gradually rearward and the wings will be swung through a predetermined path about the pivots 19, 27 and 28 until they have been fully folded back into their respective recesses 15 as shown in Figs. 4 and 6. When it is desired to lower both the landing gear and the wings, the operations above described are reversed. It will be obvious that when the auxiliary wings are opened out preparatory to landing, they will effect a braking action on the speed of the plane which may be utilized to advantage in effecting a landing.

It is obvious that in case of a non-retractable landing gear being preferred or one retractable but not acting in conjunction with the lower wings, the wings can be folded independently thereof after a landing so as to facilitate the handling of the plane whilst housing the same or in ground traffic.

Variations may be resorted to within the scope of the invention, and portions of the improvements may be used without the others whilst not departing from the spirit of the invention.

Having thus described my invention, I claim:—

1. In an aeroplane, the combination with a fuselage, a relatively fixed wing, an auxiliary wing pivotally connected thereto and adapted to be swung on said connection from an effective flying position transverse to said fuselage to a position in which the body of said wing extends flatwise along the side of the fuselage, and means under the control of a pilot to actuate in flight said auxiliary wing from one position to the other.

2. In an aeroplane, the combination of a fuselage provided with recesses on either side thereof a wing pivoted to said fuselage on either side and adapted to be swung from an effective flying position rearwardly against said fuselage and within said recesses respectively, with the body of said wing substantially parallel to said side of the fuselage, and means operable by said pilot during flight for the actuation of said wings from one position to the other.

3. In an aeroplane, the combination of a fuselage provided with a substantially rectangular recess on either side thereof adapted to receive a wing, a wing on either side of said fuselage pivotally secured thereto adjacent the forward end of said recesses and adapted to have its inner end swung through an arc centered at the lower forward corner of said recess whilst the outer end of the wing swings rearwardly until disposed within said recess, and means under the control of a pilot adapted to actuate the wings in the manner set forth.

4. In apparatus of the class described, the combination of a fuselage provided with wing size recesses on either side thereof, wings disposed on either side of said fuselage, a plurality of shafts extending through said fuselage and pivotally secured to the inner ends of each of said wings; one of said shafts being located adjacent the leading edges of said wings and rotatably secured in bearings, the other shafts extending through plates provided with arcuate slots for the guidance of said shafts, a means operable by the pilot to cause the first of said shafts to be rotated in bearings whilst the other shafts are simultaneously moved through said slots, and means to actuate the outer ends of said wings rearwardly until the wings are disposed within said recesses.

5. In an aeroplane, the combination with a fuselage provided with recesses on either side thereof, of wings pivotally connected to said fuselage, a retractable landing gear attached to said wings, means operable by the pilot to retract the landing gear into a position closely adjacent the under side of said wings; said landing gear and said wings adapted to be swung rearwardly as a unit on either side of the fuselage until disposed within said recesses, and means operable by the pilot to control the swinging of said wings.

6. In an aeroplane, the combination of a fuselage, a relatively fixed wing, an auxiliary wing on either side of said fuselage pivotally secured thereto and adapted to have its inner end swung through an arc while the outer end of the wing swings rearwardly until disposed longitudinally of the fuselage and with the body of the wing extending flatwise along a side wall thereof, and means under the control of a pilot to actuate the auxiliary wings while in flight in the manner set forth.

7. In apparatus of the class described, the combination of a fuselage, wings disposed on either side of said fuselage, a plurality of shafts extending through said fuselage and pivotally secured to the inner ends of each of said wings; one of said shafts being located adjacent the leading edges of said wings and rotatably secured in bearings, the other shafts extending through plates provided with arcuate slots for the guidance of said shafts, a means operable by the pilot to cause the first of said shafts to be rotated in bearings while the other shafts are simultaneously moved through said slots, and means to actuate the outer ends of said wings rearwardly until the wings are disposed longitudinally of the fuselage and abutting against the side walls thereof.

8. In an aeroplane, the combination with a fuselage, of wings pivotally connected to said fuselage, a retractable landing gear attached to said wings, means operable by the pilot to retract the landing gear into a position closely adjacent the under side of said wings; said landing gear and said wings adapted to be swung rearwardly as a unit on either side of the fuselage until disposed longitudinally of the fuselage and abutting against the side walls thereof, and means operable by the pilot to control the swinging of said wings.

9. In an aeroplane, the combination with a fuselage, a relatively fixed wing, an auxiliary wing and means for supporting said auxiliary wing in its effective flying position transverse to said fuselage, said means also serving to swing said auxiliary wing to a position co-longitudinal with said fuselage and with the body of the wing extending flatwise along a side wall of said fuselage and an operator for said means disposed interiorly of said fuselage, said means being operable by the pilot during flight.

10. In an aeroplane, the combination with a fuselage, of a wing and means for supporting said wing in its effective flying position transverse to said fuselage, said means also serving to swing said wing to a position co-longitudinal with said fuselage and abutting against the side wall of said fuselage, said means comprising, a rotatable shaft, means for pivotally connecting the leading edge of the wing to said shaft, and supporting operating devices attached to said wing at two other points for swinging the wing from its effective flying position to its collapsed position.

11. In an aeroplane, the combination of a fuselage, a wing pivotally connected to a side wall of the fuselage at its leading edge and having its abutting edge disposed in a substantially horizontal position against the side wall of the fuselage when the wing is in its effective flying position, means for swinging the said abutting edge to a vertical position and a pivoted strut associated with said wing whereby the operation of the swinging means causes the wing to assume a longitudinal position against the side wall of the fuselage.

12. In an aeroplane, the combination of a fuselage, an upper wing, a lower wing pivotally connected to said fuselage and adapted to be swung from an effective flying position transverse to said fuselage to a folded position co-longitudinal therewith, and with the body of the wing extending flatwise along the side of the fuselage, a strut disposed between and pivotally connected to said wings, and operating means cooperating with said strut to move said lower wing from flying to folded position in one continuous movement.

13. In an aeroplane, the combination of a fuselage, an upper wing, a lower wing pivotally connected to said fuselage and adapted to be swung from an effective flying position transverse to said fuselage to a folded position co-longitudinal therewith, and with the body of the wing extending flatwise along the side of the fuselage a strut disposed between and pivotally connected to said wings, operating means cooperating with said strut to move said lower wing from flying to folded position in one continuous movement and manual controlling means therefor disposed interiorly of said fuselage.

14. In an aeroplane, the combination of a fuselage, an upper wing, a lower wing, one of said wings being pivotally connected to said fuselage and adapted to be swung from an effective flying position transverse to said fuselage to another position co-longitudinal therewith, with the body of the wing extending flatwise along the side wall thereof, a strut disposed between and pivotally connected to said wings and operating means cooperating with said strut to move said last named wing from flying to folded position in one continuous movement.

15. In an aeroplane, the combination of a fuselage, an upper wing, a lower wing, one of said wings being pivotally connected to said fuselage, and adapted to be swung from an effective flying position transverse to said fuselage to a folded position co-longitudinal therewith, with the body of the wing extending flatwise along the side wall thereof a strut disposed between and pivotally connected to said wings, operating means cooperating with said strut to move said last named wing from flying to folded position in one continuous movement, and manually controlling means therefor disposed interiorly of said fuselage.

16. In an aeroplane, the combination of a fuselage, a fixed wing, a movable wing, and connecting means between three points on said movable wing and other parts of said aeroplane, one of said points being fixed with reference to the fuselage and operating means for moving the other points relatively thereto to permit changes in the angle of the plane of the wing simultaneously with changes in the longitudinal direction thereof.

17. In an aeroplane, the combination of a fixed wing, a movable wing, pivoted connecting means for holding one point on said movable wing fixed relatively to the aeroplane, movable connecting means between two other points on said movable wing and the aeroplane and means operable by the pilot during flight cooperating with said connecting means to change the angle of the plane of the movable wing simultaneously with changes in its longitudinal direction.

18. In an aeroplane the combination of a fuselage, a fixed wing, a movable wing, and means for swinging said movable wing from an effective flying position transverse to said fuselage to a folded position co-longitudinal therewith, said means comprising pivotal connecting means between one point on said wing and the fuselage for maintaining said point fixed relatively to said fuselage, and a pair of connecting means between two other points on said wing and other parts of the aeroplane and means operable by the pilot during flight cooperating with said connecting means to change the angle of the plane of the wing simultaneously with changes in the angle of the wing with the axis of the aeroplane to swing said wing from flying to folded position in one continuous movement.

19. In an aeroplane, the combination with a fuselage, of an auxiliary sustaining element pivotally connected thereto and adapted to be swung on said connection, from an effective flying position transverse to said fuselage, to a position co-longitudinal with the fuselage and with the body of said element extending flatwise along the side of said fuselage, together with means under the control of the pilot adapted to actuate in flight said element from one position to the other.

20. In aeroplane construction, the combination with a fuselage and a fixed wing, of a movable wing, said fixed wing being capable of sustaining the aeroplane in flight independently of said movable wing, and a three point connection for said wing to the fixed wing and fuselage, one of said points being substantially fixed with reference to the fuselage, and the other points being movable in relation thereto to permit changes in the angle of the plane of the wing simultaneously with changes in the longitudinal direction thereof.

21. In aeroplane construction, the combination with a fuselage and a fixed wing, of a movable wing, said fixed wing being capable of sustaining the aeroplane in flight independently of said movable wing, and a three point connection for said wing to the fixed wing and fuselage, one of said points being substantially fixed with reference to the fuselage, at least two of said points being movable in relation thereto to permit changes in the angle of the plane of the wings simultaneously with changes in the longitudinal direction thereof, and the third of said connections comprising a strut connecting said auxiliary wing with said fixed wing.

22. In aeroplane construction, the combination with a fuselage and a fixed wing, of a movable wing, said fixed wing being capable of sustaining the aeroplane in flight independently of said movable wing, and a three point connection for said wing to the fixed wing and fuselage, one of said points being substantially fixed with reference to the fuselage, and the other points being movable in relation thereto to permit changes in the angle of the plane of the wing simultaneously with changes in the longitudinal direction thereof, and means operable by the pilot during flight for advancing and retracting said auxiliary wings.

23. In aircraft construction, the combination with a fuselage having substantially flat side walls, of a pair of wings pivotally connected to said fuselage, said wings being adapted to be folded against the said side walls of said fuselage, the cross-section of said wings being such that when folded they form with the fuselage a stream-lined body having curved sides.

NICHOLAS J. MEDVEDEFF.